United States Patent [19]

Funk et al.

[11] Patent Number: 5,034,480

[45] Date of Patent: * Jul. 23, 1991

[54] AVOIDANCE OF COLORED IMPURITIES IN THE PREPARATION OF ULTRAHIGH MOLECULAR WEIGHT ETHYLENE POLYMERS BY MEANS OF TITANIUM-CONTAINING CATALYST SYSTEM

[75] Inventors: Guido Funk, Worms; Siegfried Weber, Weinheim; Rainer Hemmerich, Gruenstadt, all of Fed. Rep. of Germany

[73] Assignee: BASF Aktiengesellschaft, Ludwigshafen, Fed. Rep. of Germany

[*] Notice: The portion of the term of this patent subsequent to Jul. 23, 2008 has been disclaimed.

[21] Appl. No.: 409,581

[22] Filed: Sep. 19, 1989

[30] Foreign Application Priority Data

Oct. 1, 1988 [DE] Fed. Rep. of Germany ....... 3833445

[51] Int. Cl.$^5$ .............................. C08F 2/34; C08F 4/16
[52] U.S. Cl. .......................................... 526/74; 526/90; 526/114; 526/124; 526/210; 526/213; 526/352; 526/901
[58] Field of Search .................... 526/74, 142, 90, 114, 526/124, 210, 213, 352, 901; 528/484

[56] References Cited

U.S. PATENT DOCUMENTS

| 3,919,185 | 11/1975 | Takebe et al. ...................... 526/114 |
| 3,956,252 | 5/1976 | Saeda et al. ............................ 526/74 |
| 4,012,573 | 3/1977 | Trieschmann et al. . |
| 4,182,810 | 1/1980 | Willcox ................................. 526/74 |
| 4,220,580 | 9/1980 | Rowatt . |
| 4,376,191 | 3/1983 | Geck . |
| 4,420,592 | 12/1983 | Kato et al. . |
| 4,427,573 | 1/1984 | Miles et al. . |
| 4,467,080 | 8/1984 | Brun et al. . |
| 4,525,547 | 6/1985 | Kato et al. . |
| 4,532,311 | 7/1985 | Fulks et al. ........................... 526/74 |
| 4,900,798 | 2/1990 | Kerth et al. ......................... 526/152 |

FOREIGN PATENT DOCUMENTS

| 0107127 | 5/1984 | European Pat. Off. . |
| 0050013 | 1/1985 | European Pat. Off. . |
| 0059080 | 5/1986 | European Pat. Off. . |

OTHER PUBLICATIONS

Chemical Engineering 80, [1973] [27], pp. 72–73.
Chemical Abstract, vol. 83, 1975, 116,444.
Chemical Abstract, vol. 94, 1981, 16,340.

Primary Examiner—Joseph L. Schofer
Assistant Examiner—Tom Weber
Attorney, Agent, or Firm—Keil & Weinkauf

[57] ABSTRACT

Ultrahigh molecular weight ethylene polymers are prepared in the gas phase in a thoroughly mixed bed of finely divided polymer by continuous introduction of the monomer into a polymerization system at 60°–120° C. and 5–60 bar in the presence of a reaction product of a titanium-containing catalyst and an antistat and in the presence of a monohydric or polyhydric alcohol.

8 Claims, No Drawings

AVOIDANCE OF COLORED IMPURITIES IN THE PREPARATION OF ULTRAHIGH MOLECULAR WEIGHT ETHYLENE POLYMERS BY MEANS OF TITANIUM-CONTAINING CATALYST SYSTEM

The present invention relates to a process for preparing an ultrahigh molecular weight ethylene polymer by homopolymerization of ethylene or by copolymerization of ethylene with a compound copolymerizable therewith by continuously feeding the monomer into a polymerization system at 60°–125° C. and 5–70 bar, conducting the polymerization in the presence of a titanium-containing catalyst and an antistat and in the presence or absence of a molecular weight regulator in the gas phase in a thoroughly mixed bed of finely divided polymer having an average particle diameter of equal to or less than 1 mm with removal of the heat of polymerization by cooling the ethylene cycle gas, and discharging the polymer from the polymerization system.

With such processes it is possible to obtain homopolymers and copolymers of ethylene having densities of from 0.915 to 0.955 g/cm$^3$ and average molecular weights of equal to or greater than $1 \times 10^6$, the absence of a solvent or a suspension medium and high pressure making it very simple to isolate the polymer.

Processes for preparing ethylene polymers in the gas phase in a thoroughly mixed dry bed of finely divided polymer with removal of the heat of polymerization by cooling the recirculated ethylene are known from the literature (cf. Ullmanns Encyklopädie der technischen Chemie 4, [1980], [19], page 186, Verlag Chemie GmbH, D-6940 Weinheim, U.S. Pat. Nos. 4,012,573, 4,427,573, 4,376,191 and 4,467,080, EP-A-0,110,087, EP-A-0,050,013, EP-A-0,050,477 and EP-A-0,059,080 and in particular EP-A-0,230,019 and EP-A-0,260,647).

Existing processes involve the use of titanium-containing catalysts or Phillips catalysts and hydrogen as molecular weight regulator. The reactor may consist for example of a gas inlet zone, a cylindrical reaction zone and a settling zone, where the polymer particles are separated from unconverted gas. The diameter of such a known reactor is 4.5 m at the polymerization zone (cf. Chemical Engineering 80 (1973), 72–73).

However, the important requirement with this polyethylene process, which takes place close to the sintering temperature of polyethylene, is to ensure constant reaction conditions and constant mixing conditions. Despite a large number of gradual improvements it has been found again and again that deposits are formed on the reactor walls and internal fitments and that polymer clumps are obtained. This makes it impossible to maintain constant reaction conditions.

The consequences are fluctuating product quality and short reactor runs followed by complicated reactor cleaning campaigns.

It is already known from the literature to add an antistat to the polymerization system to avoid caking in the polymerization of olefins in the liquid phase, or at liquid-like densities and solution properties of supercritical ethylene, and in the suspension polymerization of ethylene (cf. EP-A1-107,127, U.S. Pat. No. 4,220,580 and Chemical Abstracts 83 [1975], 116 444, and 94 [1981], 16340). In these known processes, charges formed on suspended polymer or catalyst particles can flow off toward the wall, and in the case of the high-pressure polymerization it is possible to control the reaction and to improve the properties of the low density polyethylene.

EP-A-0,232,701 has already disclosed a process for preparing ultrahigh molecular weight ethylene polymers by polymerization of ethylene in a polymerization system at 60°–125° C. and 5–70 bar, wherein the polymerization is carried out in the presence of a catalyst and an antistat in the gas phase in a thoroughly mixed bed of finely divided polymer having an average particle size of less than or equal to 1 mm with removal of the heat of polymerization by cooling the ethylene cycle gas, the antistat being preferably added to the bed before the start of and during the polymerization.

If this process is used to prepare ultrahigh molecular weight polyethylene with a titanium-containing coagulation catalyst, for example as described in EP-A-0,230,019 and EP-A-0,260,647, the presence of an antistat leads to black impurities in the product, and the polymer has a very low bulk density.

It is an object of the present invention to prevent the formation of polymer clumps and the fouling of reactor walls and internal fitments in the gas phase polymerization of ethylene and to ensure satisfactory flow of the reaction and recycled gas through the thorougly mixed bed of particularly finely divided polymer while at the same time improving the product quality of the ultrahigh molecular weight ethylene polymer in respect of black impurities and in the direction of higher bulk density We have found that this object is achieved by a process wherein the antistat, before introduction into the polymerization system, is reacted in amounts of from 5 to 1000% by weight, based on the catalyst component, with the catalyst in the presence of one or more monohydric or polyhydric alcohols having melting points below the polymerization temperature and the resulting reaction product is added from above to the bed separately from the reactants.

Preferably, the antistat and the alcohol are reacted with the catalyst by mixing at from 0° to 50° C. in small amounts of an inert organic solvent, preferably a hydrocarbon, advantageously an acyclic hydrocarbon, in particular paraffin oil or heptane.

Preferably, the antistat is a chromium salt of an alkylsalic-vlic acid advantageously having an alkyl group of from 14 to 18 carbon atoms, a chromium salt of a $C_{10}$–$C_{18}$-alkylanthranilic acid, in particular stearylanthranilic acid, a calcium salt of a sulfo-containing diester of an alkanedicarboxylic acid of from 4 to 6 carbon atoms and alkanols of from 4 to 20 carbon atoms, advantageously a sulfosuccinic ester, in particular dioctyl or didecyl succinate, a calcium salt of Medialan acid, or a mixture thereof.

In particular, the antistat is reacted with the catalyst in amounts of from 50 to 500% by weight.

Preferably, the antistat is reacted with the catalyst by mixing at from 25° to 35° C. in small amounts of an organic solvent.

Preferably, the alcohol is present in amounts in which the molar ratio of titanium in the catalyst to hydroxyl groups in the alcohol is from 1:0.5 to 1:10, in particular from 1:0.5 to 1:5.

Suitable alcohols advantageously have from 1 to 10, in particular from 4 to 8, carbon atoms, and up to 3 hydroxyl groups. Preference is given to using alkanols of from 4 to 10 carbon atoms such as butanol, hexanol, octanol, or 2-ethylhexanol, or alkanediols of from 2 to 8 carbon atoms such as glycol or butanediol, or alkanetriols of from 3 to 8 carbon atoms such as glycerol.

Particularly preferred alcohols are hexanol and glycerol.

Ultrahigh molecular weight ethylene polymers for the purposes of the present invention are polyethylene, and copolymers of ethylene with α-monoolefins preparable with ethylene under the stated conditions, whose molecular weight exceeds $1 \times 10^6$. Preferably, the ethylene polymers have a molecular weight of from $3 \times 10^6$ to $6 \times 10^6$, where the molecular weight is the viscosity average determined according to Mark-Houwink at 135° C. in decalin. Ultrahigh molecular weight ethylene polymers are known per se.

Suitable comonomers for ethylene are in particular n-1-butene, n-1-hexene, 4-methyl-1-pentene and propene. The ethylene polymers obtained have densities of from 0.910 to 0.940 $g/cm^3$, measured by German Standard Specification DIN 53479. The ethylene polymers are obtained in finely divided form as a fine or coarse grit having a particle diameter in general from about 0.03 to 1, in particular from about 0.1 to 1, mm.

In the polymerization, the monomer is introduced as mentioned in the references cited at the beginning into a polymerization system at 60°–125° C., preferably 80°–110° C., and 5–70, preferably 20–50, bar in a continuous manner (cf. in particular EP-A-0,230,019, EP-A-0,260,647 and EP-A-0,232,701).

The polymerization itself is effected by means of a titanium-containing catalyst and an aluminum-containing catalyst component. Such catalyst systems are so familiar to the skilled worker from theory and practice as to require no further explanation here. See instead in particular EP-A-0,230,019 and EP-A-0,260,647. Such catalysts and the use thereof in the polymerization of ethylene in the gas phase are known from the above literature, so that there is no need to go into any details here. The catalysts are customarily employed in amounts of from 0.001 to 0.05% by weight, based on the prepared polymer. To prepare ultrahigh molecular weight polyethylene within the stated particle size range it is necessary for the average diameter of the catalyst particles not to exceed 20 μm.

The above remarks concerning the catalyst system apply mutatis mutandis also to any molecular weight regulators used in addition, in particular hydrogen.

The ethylene homopolymerization or copolymerization is to be carried out in conventional manner in the gas phase in a thoroughly mixed dry bed of finely divided polymer. Polymerization in the gas phase mean that neither solvent nor suspension medium is present for monomers or polymers in the polymerization zone and that no supercritical ethylene having liquid-like densities and solution properties is present. A thoroughly mixed bed encompasses both a stirred bed and a fluidized bed. The process in a stirred bed is based essentially on the process described in U.S. Pat. Nos. 3,254,070 and 3,350,376 and British Patent 1,552,438. A particularly preferred process is described in EP-A-0,110,087, wherein the heat of polymerization is removed by Joule-Thomson cooling by introducing a monomer mixture at a higher pressure than the polymerization pressure and at a colder temperature than the polymerization temperature into the polymerization zone in an excess amount in such a way that the resulting Joule-Thomson cooling maintains the desired polymerization temperature and the gaseous amount of monomer mixture not consumed by polymerization is withdrawn from the polymerization zone and, after compression and cooling, recycled back into the polymerization zone. The process in a fluidized bed is likewise so well known as to require no further explanation here (cf. EP-B1-0,004,966 and EP-A1-0,089,691).

The heat of polymerization is removed by cooling the monomer cycle gas. This cooling can be effected by means of customary heat exchangers (cf. for example U.S. Pat. No. A-4,012,573) or by evaporative cooling (cf. EP-A1-0,110,087).

The polymer is customarily discharged from the polymerization zone through depressurization valves, which are opened periodically.

In the process according to the invention, the antistat, before introduction into the polymerization system, is to be reacted in amounts of from 5 to 1000, preferably 50–500% by weight, based on the catalyst component, with the catalyst, preferably by mixing and contacting at from 0° to 50° C., in particular at from 25 to 35° C., preferably in an organic solvent, in particular in a higher-boiling paraffin oil or in hexane, and the reaction product formed is to be added to the bed from above. The organic solvent is preferably present in amounts of from 100 to 2000% by weight, based on the catalyst component. The alcohol is preferably added in a molar ratio of titanium in catalyst to hydroxyl groups in alcohol of from 1:0.5 to 1:10, in particular from 1:0.5 to 1:5, and preferably is hexanol or glycerol.

Antistats are additives of various compositions, which prevent electrostatic charge buildup. Suitable antistats are a chromium salt of an alkylsalicylic acid having an alkyl group of from 14 to 18 carbon atoms, a chromium salt of stearylanthranilic acid, a calcium salt of a sulfo-containing dioctyl or didecyl succinate, a calcium salt of Medialan acid or a mixture thereof. Antistats for ethylene polymers are reviewed in Kunststoffe 67 (1977), 154–159, and in EP-A1-0,107,127, pages 6 to 10.

A particularly suitable antistatic substance is a product from BASF AG under the tradename KEROSTAT ® 5009, which is a mixture of chromium stearylanthranilate, calcium medialanate and ditert-butylphenol, and a product from Shell AG under the tradename ASA 3, which contains a chromium alkyl salicylate and a calcium salt of a dialkyl sulfosuccinate.

In a particularly preferred procedure, the reaction of the catalyst component with the antistat and the alcohol is carried out by suspending the catalyst in paraffin oil, for example ONDINA ® 15 from Shell AG, in a weight ratio of 1:5 in a stirred vessel in the absence of oxygen and reacting the resulting suspension at 30° C. with glycerol or hexanol and a 40% strength by weight solution of ASA 3 in ONDINA ® 15 either separately or mixed for an hour, the weight ratio of catalyst:ASA 3 being 1:1.7 and the molar ratio of titanium in catalyst:hydroxyl in alcohol being 1:1.2. The catalyst suspension obtained from the reaction can be used as such or in a dilute or more concentrated form. It is similarly possible to free the catalyst from the suspension medium and to meter it into the reactor as a dry solid.

The advantages obtained with the invention over the process described in EP-A-0,232,701 are not only that the formation of adherent and/or detached polymer deposits or clumps of a certain size is avoided, the reactor conditions can be made constant and reproducible and the obtainable reactor runs are likewise very long but also that uniformly high product quality is ensured in respect of the avoidance of black impurities and the attainment of a high bulk density.

EXAMPLE 83 parts by weight of a Ziegler catalyst having a titanium content of 2.3% by weight, as described in EP-A-0,230,019, are suspended in 440 parts by weight of ONDINA ® 15 and reacted at 30° C. with a mixture of 140 parts by weight of ASA 3 and 1.5 parts by weight of glycerol in 200 parts by weight of ONDINA ® 15 in a stirred reactor under $N_2$ for one hour.

62 g of the resulting catalyst suspension (corresponding to 6 g of solid catalyst) and 14 g of triibutylaluminum as cocatalyst per hour are fed from above into a 1.5 m³ reactor holding a pulverulent bed comprising 350 kg of polyethylene granules stirred at 80 revolutions per minute. The reactor is continuously supplied with ethylene at 40 bar. The reaction temperature is 90° C. It is maintained by withdrawing unconverted hot ethylene from the reactor, cooling it down, compressing it and, after depressurization to reactor pressure, reintroducing it cold back into the reaction zone.

Per hour the reactor discharges 58 kg of polyethylene having a molecular weight of about $6 \times 10^6$ and consumed cycle gas is replaced by fresh ethylene.

Obtained without clumping or fouling in the reactor, the product has a viscosity number $[\eta]$ (as per German Standard Specification DIN 53 728) of $36 \pm 1$ dl/g and a polymer density (as per German Standard Specification DIN 53 479) of 0.928 g/cm³. The bulk density of the polymer as defined by German Standard Specification DIN 53 468 is 450 g/l. In accordance with German Standard Specification DIN 58 834, no black foreign particles can be seen as impurities in 300 g of polyethylene.

COMPARATIVE EXAMPLE

The Example is repeated, except that no glycerol is added after antistat ASA 3 has been added.

The reactor discharges 65 kg of polyethylene per hour.

Obtained without clumping and fouling in the reactor, the product has a viscosity number $[\eta]$ (as per German Standard Specification DIN 53 728) of $33 \pm 1$ dl/g and a polymer density (as per German Standard Specification DIN 53 479) of 0.930 g/cm³. The bulk density of the polymer is 440 g/l (German Standard Specification DIN 53 468). Assessed as per German Standard Specification DIN 58 834, eight black foreign particles can be seen as impurities in 300 g of polyethylene.

We claim:

1. A method for avoiding colored impurities in and increasing the bulk density of ultrahigh molecular weight ethylene homo- or copolymers prepared by homopolymerizing ethylene or copolymerizing ethylene and at least one compound copolymerizable therewith by continuously feeding the monomer(s) into a polymerization system at a temperature of from 60° to 125° C. and a pressure of from 5 to 70 bar, conducting the polymerization in the "presence of a titanium-containing catalyst and a chromium or calcium containing antistat and in" the presence or absence of a molecular weight regulator in the gas phase in a thoroughly mixed dry bed of finely divided polymer by cooling the ethylene cycle gas, and discharging the polymer from the polymerization system, the said method comprising the steps of:

"(i) reacting the calciu or chromium containin antistat before introduction into the" polymerization system, in amounts of from 5 to 1000% by weight, based on the catalyst component, with the catalyst in the presence of one or more monohydric or polyhydric alcohols having melting points below the polymerization temperature and (ii) adding the resulting reaction product to the said bed of finely divided polymer from above.

2. A process as defined in claim 1, wherein the antistat is reacted with the catalyst by mixing at from 0° to 50° C. in small amounts of an inert organic solvent.

3. A process as defined in claim 1, wherein the antistat is reacted with the catalyst by mixing at from 0° to 50° C. in small amounts of paraffin oil or heptane.

4. A process as defined in claim 1, wherein the antistat is a chromium salt of an alkylsalicylic acid having an alkyl group of from 14 to 18 carbon atoms, a chromium salt of stearylanthranilic acid, a calcium salt of a sulfo-containing dioctyl or didecyl succinate, a calcium salt of Medialan acid, or a mixture thereof.

5. A process as defined in claim 1, wherein the antistat is reacted with the catalyst in amounts of from 50 to 500% by weight.

6. A process as defined in claim 1, wherein an alkanol of from 4 to 10 carbon atoms, an alkanediol of from 2 to 8 carbon atoms or an alkanetriol of from 3 to 8 carbon atoms is used.

7. A process as defined in claim 1, wherein the molar ratio of titanium in catalystto hydroxyl in alcohol is from 1:0.1 to 1:10.

8. A process as defined in claim 1, wherein the alcohol is hexanol or glycerol.

* * * * *